United States Patent
Yamaguchi

(10) Patent No.: US 6,501,919 B1
(45) Date of Patent: Dec. 31, 2002

(54) COPYING MACHINE, CONTROL METHOD THEREFOR, AND MULTI FUNCTION PERIPHERAL

(75) Inventor: Ryusuke Yamaguchi, Yamato (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/011,918

(22) Filed: Nov. 6, 2001

(51) Int. Cl.[7] .............................................. G03G 15/00
(52) U.S. Cl. .............................. 399/70; 399/67; 399/69
(58) Field of Search ........................... 215/216; 399/38, 399/67, 68, 69, 70, 320, 328

(56) References Cited

U.S. PATENT DOCUMENTS 5,729,789 A * 3/1998 Tamaki ..................... 399/70
5,854,957 A * 12/1998 Morikawa ................... 399/38

* cited by examiner

Primary Examiner—Hoang Ngo
(74) Attorney, Agent, or Firm—Frishauf, Holtz, Goodman & Chick, P.C.

(57) ABSTRACT

When an instruction to start copying is provided, a CPU estimates heat time required until the temperature of a heater of a printer reaches an operating temperature. The CPU also estimates read time required for reading an original document by a scanner. Then, the CPU subtracts the read time from the heat time to obtain standby time and causes the scanner to start reading the original document when the standby time elapses from when the instruction to start copying is provided.

8 Claims, 2 Drawing Sheets

COPYING MACHINE, CONTROL METHOD THEREFOR, AND MULTI FUNCTION PERIPHERAL

BACKGROUND OF THE INVENTION

1. Field of the Invention

The present invention relates to a copying machine comprising a printer having a heater, such as an electrophotographic printer, which copies an original document using the printer, and a control method for the copying machine, and a multi-function peripheral (MFP).

2. Description of the Related Art

In an MFP mounted with a printer having a heater such as an electrophotographic printer, the temperature of the heater needs to be maintained at a given operating temperature in order to do printing. A large amount of power is therefore consumed for the printing.

In most cases, a power save mode is prepared for the MFP. In the power save mode, the heater is turned off or its temperature is maintained at a standby temperature that is lower than the operating temperature. Accordingly, power consumption is reduced.

The power save mode is released as the need for executing a job arises. If the power save mode is released, the heater is heated. When the temperature of the heater reaches the operating temperature, the MFP enters a ready state to allow the job to be executed.

If a copy needs to be made when the MFP is set in the power save mode, the power save mode is released first as described above. After the MFP enters a ready state, it reads an original document. After the MFP completes reading the original document, it prints an image obtained by reading the original document.

While the MFP is reading an original document, no printing is performed though it is in a state of readiness to print. Consequently, time required until the completion of copying is lengthened more than necessary.

BRIEF SUMMARY OF THE INVENTION

An object of the present invention is to provide a copying machine that is capable of making a copy speedily.

According to one aspect of the present invention, the following copying machine is provided.

The copying machine comprises a scanner which reads an original document and generates image data corresponding to the original document, a printer having a heater, which prints based on the image data when a temperature of the heater is set at a given temperature, a first estimation section which estimates heat time required until the temperature of the heater reaches the given temperature, when an instruction to start copying is provided, a second estimation section which estimates read time required for reading the original document by the scanner, and a read control section which subtracts the read time from the heat time to obtain standby time and causes the scanner to start reading when the standby time elapses from when the instruction to start copying is provided.

According to another aspect of the present invention, the following control method is provided.

The control method for controlling a copying machine comprising a scanner which reads an original document and generates image data corresponding to the original document and a printer having a heater, which prints based on the image data when a temperature of the heater is set at a given temperature, comprises estimating heat time required until the temperature of the heater reaches the given temperature, when an instruction to start copying is provided, estimating read time required for reading the original document by the scanner, and subtracting the read time from the heat time to obtain standby time and causing the scanner to start reading when the standby time elapses from when the instruction to start copying is provided.

According to still another aspect of the present invention, the following multi-function peripheral is provided.

The multi-function peripheral which allows a plurality of varieties of jobs including copying of an original document, comprises an image storage used to store image data by the plurality of jobs including the copying, a scanner which reads the original document and generates image data corresponding to the original document, a storage control section which stores the image data generated by the scanner in the image storage, a printer having a heater, which prints based on the image data when a temperature of the heater is set at a given temperature, a first estimation section which estimates heat time required until the temperature of the heater reaches the given temperature, when an instruction to start copying is provided, a second estimation section which estimates read time required for reading the original document by the scanner, and a read control section which subtracts the read time from the heat time to obtain standby time and causes the scanner to start reading when the standby time elapses from when the instruction to start copying is provided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

One embodiment of the present invention will now be described with reference to the accompanying drawings.

Figure 1:
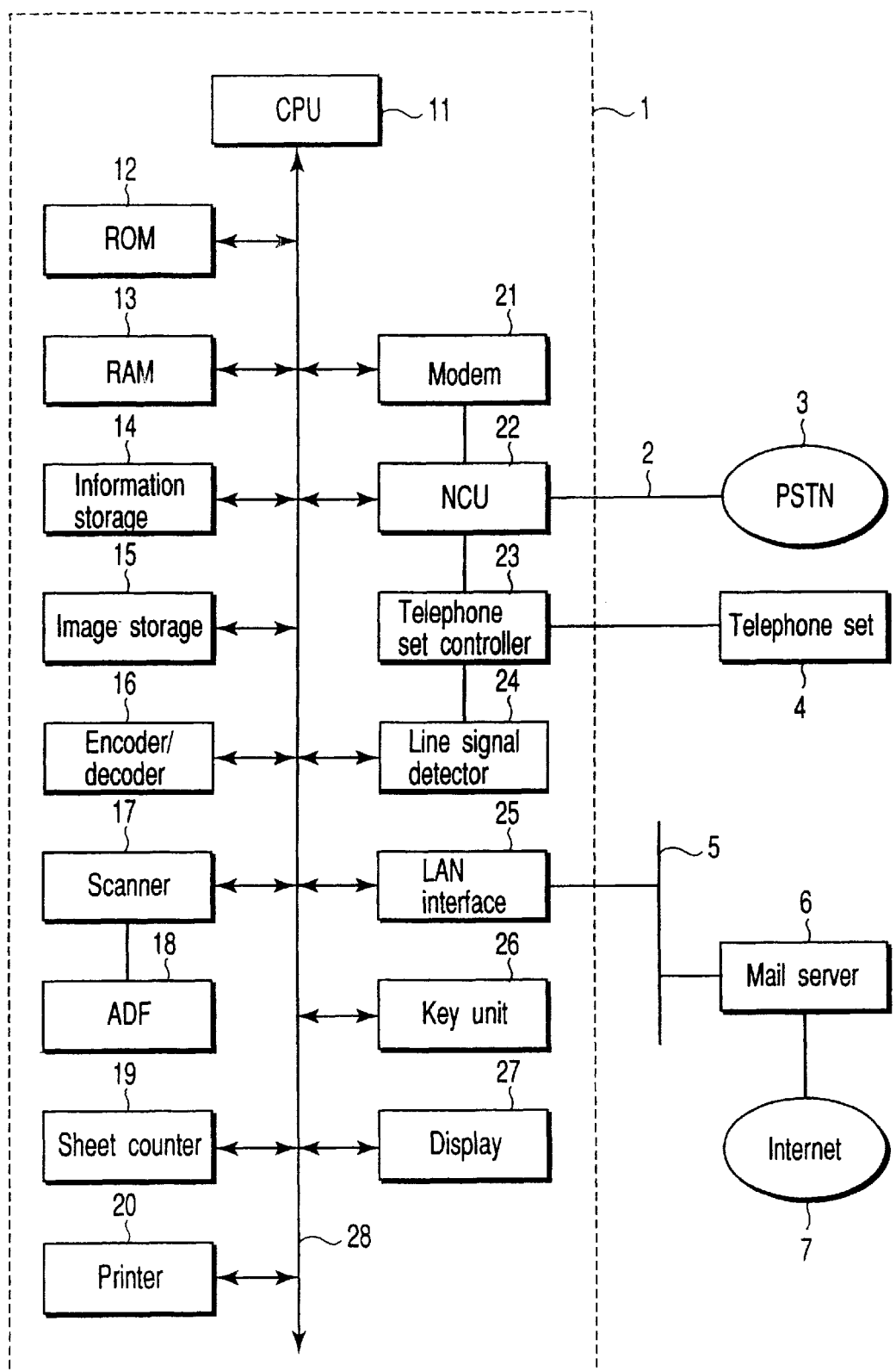
FIG. 1 is a block diagram showing an MFP according to an embodiment of the present invention.

FIG. 1 is a block diagram showing an MFP according to the embodiment of the present invention.

In FIG. 1, reference numeral 1 denotes the MFP of the present embodiment. The MFP 1 includes a CPU 11, a ROM 12, a RAM 13, an information storage 14, an image storage 15, an encoder/decoder 16, a scanner 17, an automatic document feeder (hereinafter referred to as ADF) 18, a sheet counter 19, a printer 20, a modem 21, a NCU 22, a telephone set controller 23, a line signal detector 24, a LAN interface 25, a key unit 26, and a display 27, as illustrated in FIG. 1.

The CPU 11, ROM 12, RAM 13, information storage 14, image storage 15, encoder/decoder 16, scanner 17, sheet counter 19, printer 20, modem 21, NCU 22, line signal detector 24, LAN interface 25, key unit 26, and display 27 are connected to each other via a bus 26. The ADF 18 is connected to the scanner 17. The modem 21 and telephone set controller 23 are connected to the NCU 22, and the line signal detector 24 is connected to the telephone set controller 23.

The CPU 11 processes software based on the operation programs stored in the ROM 12 and thus controls the respective sections in order to perform an operation of the MFP.

The ROM 12 stores the operation programs and other necessary data.

The RAM 13 is used as a work area for storing various types of information required when the CPU 11 performs various processes.

The information storage 14 includes, for example, a flash memory. The information storage 14 stores various types of setting information and other information.

The image storage 15 includes a large-capacity DRAM, a hard disk or the like. The image storage 15 temporarily stores image data that is processed by various jobs for copying and facsimile communications.

The encoder/decoder 16 encodes the image data for redundancy compression. The encoder/decoder 16 decodes the image data that is encoded for redundancy compression.

The scanner 17 reads an original document to be transmitted and generates image data corresponding to the original document.

The ADF 18 has an ADF tray in which a plurality of original documents can be set. The ADF 18 feeds the original documents set in the ADF tray to the scanner 17 one by one.

The sheet counter 19 is mounted on the ADF 18. The sheet counter 19 counts the number of original documents set in the ADF tray. The sheet counter 19 has, for example, an optical sensor. The optical sensor senses, for example, the total thickness of the original documents set in the ADF tray and, based on the sensed thickness, the sheet counter 19 counts the number of original documents.

The printer 20 prints an image corresponding to the image data on printing paper. The printer 20 is of an electrophotographic type and has a heater for fixing. The printer 20 controls the temperature of the heater at a given operating temperature when the image is printed.

The modem 21 modulates the image data to produce a facsimile transmission signal and modulates a command supplied from the CPU 11 to produce a command transmission signal. The modem 21 sends out these transmission signals to a PSTN subscriber line 2 through the NCU 22. The modem 21 is supplied with a facsimile transmission signal, which comes through the PSTN subscriber line 2, and a command transmission signal via the NCU 22. The modem 21 demodulates the facsimile transmission signal to reproduce image data and demodulates the command transmission signal to reproduce a command.

A PSTN 3 is connected to the NCU 22 through the PSTN subscriber line 2. The NCU 22 monitors the status of the PSTN subscriber line 2 and transmits a signal to the PSTN 3. The NCU 22 equalizes a facsimile transmission signal supplied to the PSTN subscriber line 2 from the modem 21 and sets an output level of the facsimile transmission signal.

A telephone set 4 is connected to the telephone set controller 23 when the need arises. The telephone set controller 23 performs known control to allow a call through the PSTN subscriber line 2 using the telephone set 4 connected thereto.

Various signals coming through the PSTN subscriber line 2 are supplied to the line signal detector 24 via the NCU 22 and telephone set controller 23. The line signal detector 24 monitors these signals and detects the coming of a predetermined signal.

The LAN interface 25 is connected to a LAN 5. A mail server 6 is connected to the LAN 5. Further, the mail server 6 is connected to the Internet 7. The LAN interface 25 transfers data through the LAN 5 and the Internet 7.

The key unit 26 has a number of key switches and receives various instructions that are given to the CPU 11 from a user.

The display 27 is composed of, for example, an LCD and displays various types of information to be reported to a user, under the control of the CPU 11.

The CPU 11 processes software based on the operation programs stored in the ROM 12 to operate as each of a first estimation section a reception section, a second estimation section, a read control section, and a storage control section as well as a generally-known control section of the MFP.

The first estimation section acquires information indicative of the present temperature of the heater from the printer 20 and, based on the above temperature, estimates heat time required for heating the heater to an operating temperature. The reception section receives user's designation of the number of original documents set in the ADF 18. The second estimation section estimates read time required for reading all of the original documents set in the ADF 18 based on the number of original documents counted by the sheet counter 19 or the number of original documents designated by the user. The read control section controls the scanner 17 to start reading an original document at the timing that depends upon both the heat time and read time. The storage control section stores image data generated by the scanner 17 in the image storage 15 before it is supplied to the printer 20.

An operation of the MFP 1, which is configured as described above, will now be described. The MFP 1 has a plurality of varieties of functions such as a copy function, a printer function, a facsimile function, and a scanner function. Since, however, the operations of fulfilling the functions other than the copy function are the same as those of the conventional MFP, their descriptions are omitted. The operation of the MFP 1 will now be described with an emphasis on the copy function that is the feature of the present invention.

In order to cause the MFP 1 to make a copy, a user sets an original document in the ADF tray of the ADF 18. Then, the user performs a given operation using the key unit 26 and gives an instruction to make the copy.

Figure 2:
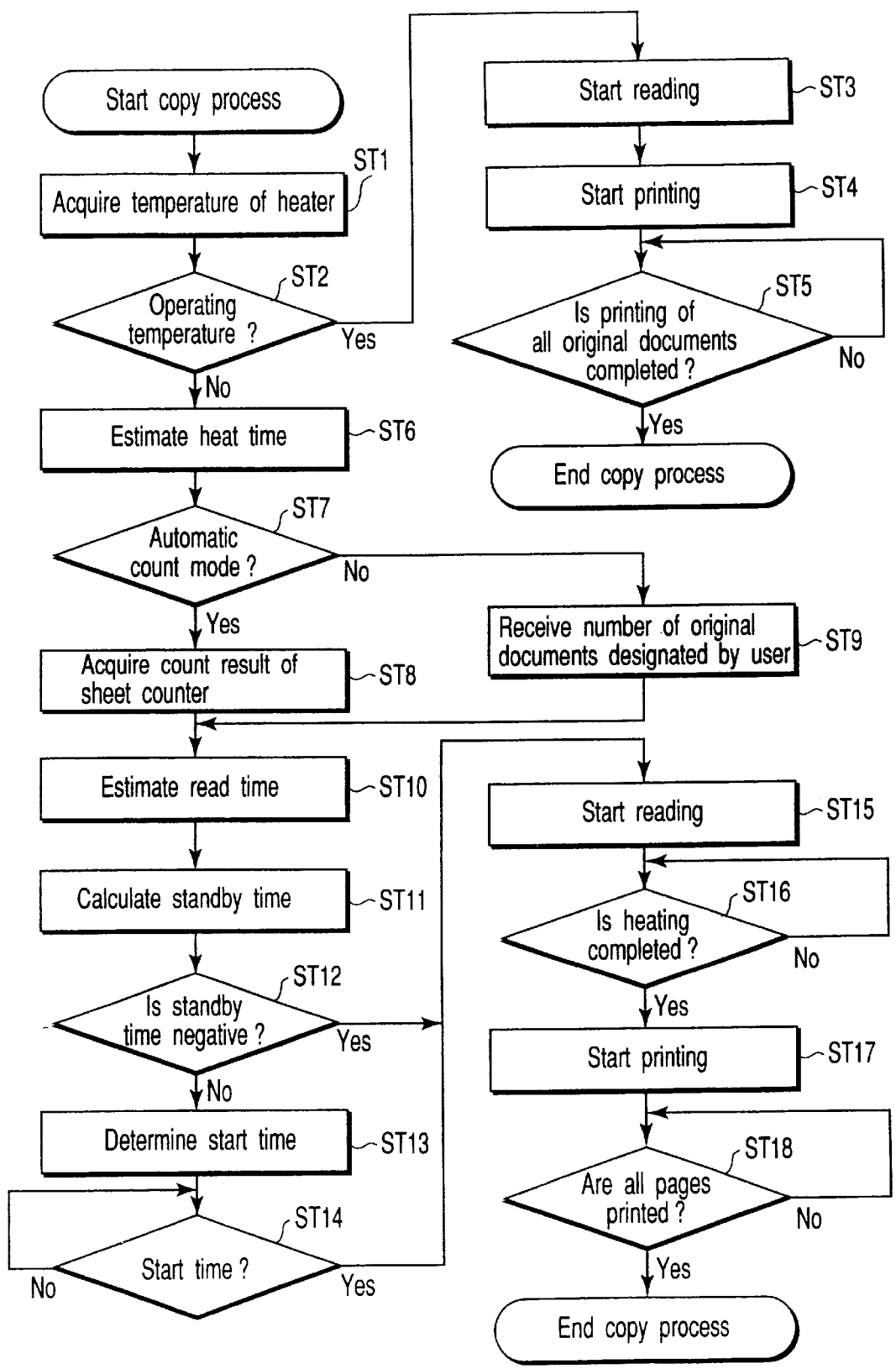
FIG. 2 is a flowchart of a copy process.

In response to the instruction, the CPU 11 performs a copy process shown in FIG. 2.

In the copy process, the CPU 11 first acquires the present temperature of the heater (step ST1) and confirms whether the temperature is an operating temperature or not (step ST2).

If no power save mode is set but the temperature of the heater is controlled at the operating temperature when an instruction to copy is provided, printing can be started at once. If, therefore, the CPU 11 confirms that the temperature of the heater is the operating temperature, it causes the scanner 17 to start reading at once (step ST3). The CPU 11 causes the printer 20 to start printing (step ST4). However, the CPU 11 temporarily stores the image data generated by the scanner 17 in the image storage 15. The CPU 11 supplies image data to the printer 20 page by page. In this state, the CPU 11 stands by to completely print all the original documents (step ST5). If the CPU 11 confirms that all the original documents are printed, it ends the copy process.

If the power save mode is set when an instruction to copy is provided, the temperature of the heater is lower than the operating temperature and thus printing cannot be started at once. The power save mode is released in accordance with the instruction to copy, and the heater is heated in the printer 20. If, therefore, the CPU 11 confirms that the temperature of the heater is not the operating temperature in step ST2, it estimates heat time required until the temperature of the heater reaches the operating temperature (step ST6). The heat time can be obtained based on the characteristics of the heater and the present temperature acquired in step ST1.

Then, the CPU 11 confirms whether an automatic count mode is set as a mode for counting the number of original documents set in the ADF 18 (step ST7). When the CPU 11 confirms that the automatic count mode is is set, it obtains a result of the counted number from the sheet counter 19 (step ST8). If, however the CPU 11 confirms that the automatic count mode is not set, it receives the number of original documents designated through a user operation in the key unit 26 (step ST9 ). The CPU 11 estimates read time based on the number of original documents corresponding to the count result obtained in step ST8 or the number of original documents designated in step ST9 (step ST10).

After that, the CPU 11 subtracts the read time estimated in step ST10 from the heat time estimated in step ST6 to calculate standby time (step ST11). The CPU 11 confirms whether the standby time is negative or not (step ST12).

If the CPU 11 confirms that the standby time is not negative, it determines start time as time when the standby time elapses from the time when the instruction to copy is given (step ST13), and stands by for the coming of the start time, (step ST14).

If the CPU 11 confirms the coming of the start time, it causes the scanner 17 to start reading (step T15). While the scanner 17 is reading an original document, the CPU 11 stands by for the completion of heating of the heater in the printer 20 (step ST16). The original document is therefore read during the heating of the heater. The CPU 11 stores the image data so generated by the scanner 17 in the image storage 15.

If the CPU 11 confirms that the heating of the heater is completed, it causes the printer 20 to start printing (step ST17). Then, the CPU 11 supplies the image data stored in the image storage 15 to the printer 20 page by page. In this state, the CPU 11 stands by for the completion of printing of all the original documents (step ST18), and ends the copy process when it confirms the completion.

When the CPU 11 confirms that the standby time is negative in step ST12, it moves to step ST15 without executing step ST13 or ST14 and causes the scanner to start reading at once.

According to the present embodiment described above, when the heater needs to be heated, the scanner 17 carries out a reading operation during the heating of the heater. For this reason, printing can be started immediately after the heating of the heater is completed. As a result, time required for completion of copy can be shortened.

According to the present embodiment, the heat time and read time are each estimated. The read time is subtracted from the heat time to obtain the standby time. The scanner 17 starts reading when the standby time elapses from the time when an instruction to copy is given. If, therefore, the heat time and read time are correctly estimated, the heating of the heater and the reading by the scanner 17 are completed at the same time. Actually, there is a difference between the heat time and read time; therefore, the heating completion timing and the reading completion timing are slightly varied from each other due to the above difference, not varied greatly. Thus, the printer 20 starts to print almost at the same time when the scanner 17 completes reading. Consequently, no wasted time is taken until printing is started after the completion of heating of the heater and thus time required for copying can be minimized.

If there is spare time from the completion of reading to the start of printing, a user is likely to understand by mistake that trouble occurs. However, in the present embodiment described above, the printer 20 starts printing almost at the same time when the scanner 17 completes reading. The above-described drawback can thus be prevented.

According to the present embodiment, since image data starts to be printed immediately after it is completely read, a period of time during which the image data is stored in the image storage 15 can be shortened. Consequently, the use efficiency of the image storage 15 can be enhanced. Especially in the case of an MFP as in the present embodiment, the image storage 15 is used even for a job other than copying and thus a period of time of use of the image storage 15 for copying can be shortened; therefore, the image storage 15 can effectively be used in other jobs.

According to the present embodiment, the sheet counter 19 is provided to automatically count the number of original documents set in the ADF 18. Thus, a user can save his or her trouble to designate the number of original documents, and the usability is improved. If, however, the sheet counter 19 is simply configured as exemplified in the above embodiment, a count error due to a variation in the thickness of one original document is likely to increase. When the count error of the sheet counter 19 is large, an estimation error in read time is increased, and the heat completion timing and read completion timing greatly vary from each other.

According to the present embodiment, a user can designate the number of original documents set in the ADF 18. Thus, the CPU 11 is able to exactly know the number of original documents, thereby reducing the estimation error in read time. Consequently, variations between the heat completion timing and read completion timing can be reduced. In this case, however, the user has to designate the number of original documents and thus his or her burden is increased.

Moreover, in the present embodiment, a mode is selectively set to determine whether the sheet counter 19 automatically counts the number of original documents or a user designates it. A flexible operation can thus be performed in accordance with the needs of the user.

In the foregoing embodiment, all of original document are read during the heating of the heater. However, the present invention can be applied to an MFP in which one original document or a given number of original documents are defined as a unit number and printing is performed every time the original documents are read per unit number. In this case, the number of original documents to be read during the heating of the heater should be set not larger than the unit number. If, therefore, the number of original documents set in the ADF 18 is not smaller than the unit number, time required for reading the unit number of original documents is defined as read time. If, furthermore, the number of original documents set in the ADF 18 does not reach the unit number, time required for reading all of the original documents set in the ADF 18 is defined as read time.

In the foregoing embodiment, a mode is selectively set to determine whether the sheet counter 19 automatically counts the number of original documents or a user designates it. However, only one of them can be used.

Additional advantages and modifications will readily occur to those skilled in the art. Therefore, the invention in its broader aspects is not limited to the specific details an representative embodiments shown and described herein. Accordingly, various modifications may be made without departing from the spirit or scope of the general inventive concept as defined by the appended claims and their equivalents.

What is claimed is:

1. A copying machine comprising:
    a scanner which reads an original document and generates image data corresponding to the original document;
    a printer having a heater, which prints based on the image data when a temperature of the heater is set at a given temperature;
    a first estimation section which estimates heat time required until the temperature of the heater reaches the given temperature, when an instruction to start copying is provided;
    a second estimation section which estimates read time required for reading the original document by the scanner; and
    a read control section which subtracts the read time from the heat time to obtain standby time and causes the scanner to start reading when the standby time elapses from when the instruction to start copying is provided.

2. The copying machine according to claim 1, further comprising:
    a document feed mechanism in which a plurality of original documents are allowed to be set and which feeds the set original documents to the scanner one by one;
    an image storage in which image data corresponding to each of the plurality of original documents is allowed to be stored; and
    a storage control section which stores the image data generated by the scanner in the image storage, and
    wherein the second estimation section estimates time required for storing all the image data generated by reading the original documents set in the document feed mechanism by the scanner, as the read time.

3. The copying machine according to claim 2, further comprising a counter which counts the number of original documents set in the document feed mechanism, and wherein the second estimation section estimates the read time based on a count result of the counter.

4. The copying machine according to claim 2, further comprising a reception section which receives designation of the number of original documents set in the document feed mechanism, and wherein the second estimation section estimates the read time based on the designation received by the reception section.

5. The copying machine according to claim 2, further comprising:
    a counter which counts the number of original documents set in the document feed mechanism; and
    a reception section which receives designation of the number of original documents set in the document feed mechanism, and
    wherein the second estimation section estimates the read time based on any effective one of a count result of the counter and the designation received by the reception section.

6. The copying machine according to claim 1, wherein when the standby time is negative, the read control section confirms that the standby time is negative and causes the scanner to start reading the original document.

7. A control method for controlling a copying machine comprising a scanner which reads an original document and generates image data corresponding to the original document and a printer having a heater, which prints based on the image data when a temperature of the heater is set at a given temperature, the control method comprising:
    estimating heat time required until the temperature of the heater reaches the given temperature, when an instruction to start copying is provided;
    estimating read time required for reading the original document by the scanner; and
    subtracting the read time from the heat time to obtain standby time and causing the scanner to start reading when the standby time elapses from when the instruction to start copying is provided.

8. A multi-function peripheral which allows a plurality of varieties of jobs including copying of an original document, the multi-function peripheral comprising:
    an image storage used to store image data by the plurality of jobs including the copying;
    a scanner which reads the original document and generates image data corresponding to the original document;
    a storage control section which stores the image data generated by the scanner in the image storage;
    a printer having a heater, which prints based on the image data when a temperature of the heater is set at a given temperature;
    a first estimation section which estimates heat time required until the temperature of the heater reaches the given temperature, when an instruction to start copying is provided;
    a second estimation section which estimates read time required for reading the original document by the scanner; and
    a read control section which subtracts the read time from the heat time to obtain standby time and causes the scanner to start reading when the standby time elapses from when the instruction to start copying is provided.

* * * * *